United States Patent

Mayer et al.

[11] Patent Number: 5,766,475
[45] Date of Patent: Jun. 16, 1998

[54] WASTE WATER DISPOSAL SYSTEM

[75] Inventors: Robert B. Mayer, Manassas, Va.;
Thomas A. Sinclair, Tucker, Ga.

[73] Assignee: American Manufacturing Company, Inc., Manassas, Va.

[21] Appl. No.: 558,011

[22] Filed: Nov. 13, 1995

[51] Int. Cl.$^6$ .................................................. C02F 3/30
[52] U.S. Cl. ........................ 210/605; 210/86; 210/104; 210/143; 210/150; 210/151; 210/170; 210/195.1; 210/196; 210/532.2; 210/617; 210/618; 210/622; 210/744; 210/747
[58] Field of Search ........................ 210/605, 617, 210/622, 744, 747, 86, 104, 143, 150, 151, 170, 195.1, 196, 532.2, 618

[56] References Cited

U.S. PATENT DOCUMENTS

| | | |
|---|---|---|
| 2,578,981 | 12/1951 | Parker . |
| 3,425,936 | 2/1969 | Culp et al. . |
| 3,724,664 | 4/1973 | Lemberger et al. . |
| 3,844,946 | 10/1974 | Farrell, Jr. . |
| 3,920,550 | 11/1975 | Farrell, Jr. et al. . |
| 3,933,641 | 1/1976 | Hadden et al. . |
| 4,251,359 | 2/1981 | Colwell et al. . |
| 4,623,451 | 11/1986 | Oliver . |
| 4,812,237 | 3/1989 | Cawley et al. ........................ 210/605 |
| 4,818,420 | 4/1989 | Mims . |
| 4,966,705 | 10/1990 | Jamieson et al. ........................ 210/104 |
| 4,986,905 | 1/1991 | White . |
| 5,017,040 | 5/1991 | Mott . |
| 5,091,095 | 2/1992 | Fries et al. ........................ 210/104 |
| 5,128,040 | 7/1992 | Molof et al. ........................ 210/605 |
| 5,534,147 | 7/1996 | Kallenbach et al. ........................ 210/605 |
| 5,597,477 | 1/1997 | Harry, III ........................ 210/532.2 |

*Primary Examiner*—Peter A. Hruskoci
*Assistant Examiner*—Betsey J. Morrison
*Attorney, Agent, or Firm*—Hinkle & Associates, P.C.

[57] ABSTRACT

An on-site waste water treatment system is disclosed suitable for domestic or other sewage. After the initial separation of the gravity settleable solids in a treatment tank, the effluent is conveyed to a recirculation/dosing tank. The recirculation/dosing tank has three level indicators which transmit information to the system controller. The low level indicator provides enough waste water to dose a media bed and dilute effluent from the treatment tank. While the low level indicator is activated, the waste water will circulate through a disc filter to a recirculating media bed. From the media bed, the effluent is returned to the recirculation/dosing tank, the waste water flows from the treatment tank to the recirculation/dosing tank and activates the second level indicator, enabling the system to pass the combined effluent through a disc filter to a final disposal field. If the second level indicator has been disengaged for a sufficient period of time, the effluent passes through the disc filter and recirculating media bed for a set number of times before the effluent is conveyed through the disc filter to the final disposal field.

21 Claims, 4 Drawing Sheets

Fig_1

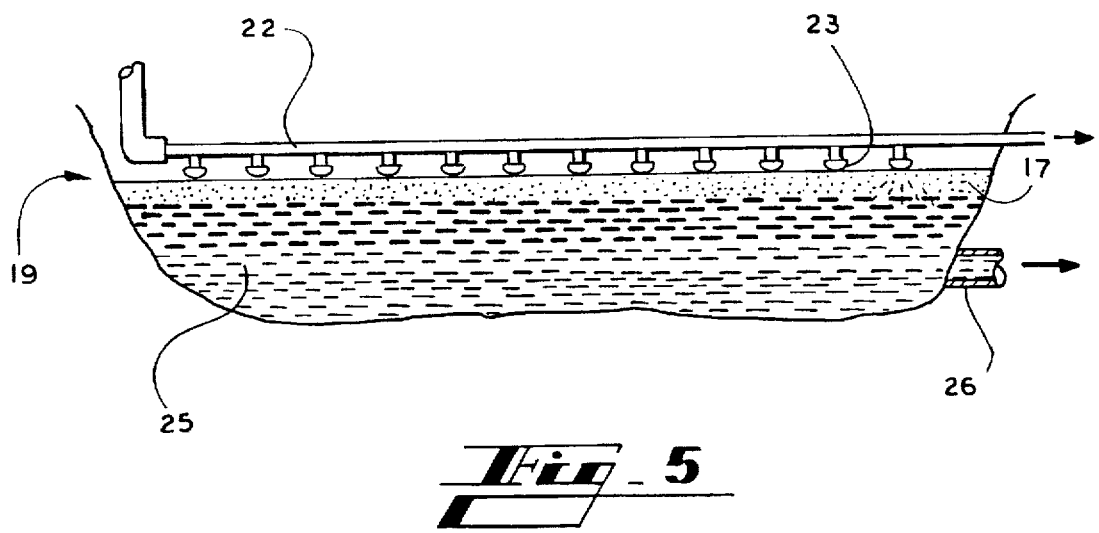
Fig_5 ed solids, fallen debris, and vegetative growth. Also, leaf litter, algae, other organic debris and thick mats of moss tend to accumulate in the filter distribution troughs. An alternative method for distributing effluent over the sand filter surface is an irrigation, spray head. However, the orifices in the spray head tend to clog with organic material in a short period of time.
WASTE WATER DISPOSAL SYSTEM

BACKGROUND OF THE INVENTION

I. Field of the Invention

The present invention relates generally to the field of an on-site waste water treatment system and an on-site method of treating waste water.

II. Description of the Related Art

On-site disposal of waste water from homes and small businesses in areas without a conventional sewer system has traditionally been accomplished through a conventional septic tank soil absorption system. In a conventional septic tank soil absorption system, gravity settleable solids in the waste water stream are removed in the septic tank in an anaerobic process. The resulting anaerobic effluent passes through a series of perforated pipes buried in a gravel receiving field in order to flow from the perforated pipes into the gravel field and, subsequently, into the ground. The quality of the resulting absorption treatment and filtration depends on the characteristics of the soil and the site. Characteristics of the site, such as permeability, drainage, slope, and depth to limiting conditions such as groundwater or bedrock, will determine whether a conventional septic tank soil absorption system will fail. A septic tank soil absorption system fails by causing ponding of the effluent on the surface of the disposal area, or by causing ground or surface water pollution. Other limitations on the performance of a septic tank soil absorption system include the size of the lot and the required setbacks from wells, structures, waterways, and property lines.

For the installation of a conventional trench absorption area associated with a septic tank soil absorption system, typically all vegetation, including stumps, is removed or destroyed prior to and during the installation. These practices can often result in a considerable amount of damage to the site through compaction, erosion, and soil removal or disturbance. Any disturbance of this type to the soil surface will be detrimental to the absorptive capacity of the soil and will require stabilization and revegetation.

In order to address the problems and limitations described above, there have been many advances over the well known septic tank soil absorption system. Disposal methods, pre-treatment methods, and combinations of disposal and pre-treatment methods have been developed in order to better dispose of waste water effluent. These systems include sand filters, mound systems, evapotranspiration systems, low pressure pipe systems, and drip soil absorption systems.

In any system which further treats anaerobic effluent from a conventional septic tank, it is important that a minimum of solid material remain in the effluent, especially if the effluent is going to be piped into a land spray system or piped into a buried drip application system. Both types of systems are easily clogged due to the small clearances of the discharge apparatus required for effective application.

One alternative to the conventional septic tank soil absorption system is the Hines-Favreau type system. In the Hines-Favreau type system, effluent is discharged, after separation of the gravity settleable solids in the septic tank, into a recirculation tank. The effluent is pumped from the recirculation tank into perforated drain troughs, which are usually constructed of from 1½ to 4 inch diameter piping, positioned above the level of the sand in a conventional sand filter. The effluent passes through the sand filter, and mechanical and biological filtration of the effluent occurs. After the effluent is collected at the bottom of the sand filter, the effluent stream is split with a portion of the effluent returning to the recirculation tank to be filtered again and another portion of the effluent being discharged to a drain field. After a period of time with the Hines-Favreau system, the sand filter surface becomes matted and clogged with filtered solids, fallen debris, and vegetative growth. Also, leaf litter, algae, other organic debris and thick mats of moss tend to accumulate in the filter distribution troughs. An alternative method for distributing effluent over the sand filter surface is an irrigation, spray head. However, the orifices in the spray head tend to clog with organic material in a short period of time.

U.S. Pat. No. 4,251,359 issued to Colwell et al. (hereinafter referred to as the '359 Patent) discloses an improvement over the Hines-Favreau recirculating sand filter system. In the '359 Patent, after separation of the gravity settleable solids by the septic tank, the effluent flows into a wet well 11. From the wet well the effluent is pumped to the sand filter by means of two submersible pumps 12 and 13. The effluent enters the whole media bed or a portion thereof through lines 33 and 34. Lines 33 and 34 lead to subsurface distribution lines 35 and 36 which are preferably comprised of perforated pipes four (4) inches in diameter and equipped with multiple perforations facing upwardly. After entering the bed through the subsurface distribution lines 35 and 36, the anaerobic effluent passes through the media to the bottom of the bed where it is collected in a center trench 31. The first time that the effluent enters the media bed from the subsurface distribution lines 35 and 36 it enters the bed at a position where the effluent is certain to flow into the center trench 31 for recirculation. From the center trench 31, the effluent flows by gravity to a recirculation tank 50. From the recirculation tank 50, the prefiltered effluent is then returned to the sand filter by being pumped through a series of lines 60, having a plurality of nozzles 61 at their discharge, onto the upper surface of the media bed. About one third of the recirculated effluent, as it is displaced from the media a second time, collects in the outside trenches 30 and 32 from where it can then be discharged to its final disposal field. With the system described, all of the effluent from the septic tank enters the sand filter initially through the perforated pipes of the subsurface distribution lines 35 and 36. In order to avoid clogging, the perforated pipes are sized at up to four (4) inches diameter which leads to relatively large volumes of effluent being dosed to the filter. These large doses can lead to an unequal distribution of the effluent and flooding of the sand filter in the areas where the initial application of the effluent is administered. Also, the system splits the effluent flow into a portion for final disposal and a portion for recirculation which requires a control system and hardware to perform duplicate functions for the two different effluent streams.

SUMMARY OF THE INVENTION

It is a primary object of this invention to provide an on-site waste water treatment system that utilizes a media bed and a final disposal field in the most efficient manner possible by using drip disposal techniques for the application of the effluent to the sand filter, by prefiltering effluent prior to the initial contact with the sand filter, and by eliminating the splitting of the effluent stream.

It is a further object of this invention to provide a dependable and economical on-site waste water treatment system. By eliminating the controls and mechanical devices associated with splitting the effluent stream, the system becomes simpler and easier to maintain. By utilizing drip disposal techniques to apply the effluent to the media bed,

3 the effluent is more evenly distributed across the surface area of the media bed. By prefiltering effluent prior to the first application to the media bed, the throughput for the media bed can be increased thereby reducing the size of the media bed required, and also, the maintenance required will decrease as the media bed is not exposed directly to the effluent from the septic tank.

The process of the present invention starts with raw waste water entering into a septic type treatment tank system which normally functions as an anaerobic solids tank. After separation of the gravity settleable solids in the septic tank, the effluent flows by gravity or is conveyed to a single tank which acts as both a recirculation tank and a final dosing tank. This recirculation/dosing tank has three floats positioned at different levels in the tank. The first level indicator provides enough water in the tank to provide a volume of waste water sufficient to dose the media bed. Also, the first level indicator maintains enough filtered effluent in the tank to dilute influent from the septic tank enough to maintain minimum quality for disposal in a final disposal field. According to the settings on a system controller and for as long as the first level indicator is engaged, the waste water in the tank will be recirculated through the media bed for a preset and variable number of cycles.

From the media bed, the effluent is returned to the recirculation/dosing tank where it combines with the septic tank influent. After the desired number of cycles with the second level indicator not activated, the media bed will be rested.

According to the usage of the system, waste water will flow from the septic tank into the recirculation/dosing tank and activate the second level indicator. This level indicator will allow for final disposal of the waste water. The effluent will be disposed of through a subsurface drip field at the site selected for final disposal. If the second level indicator has been disengaged for a sufficient period of time prior to the signal for final disposal, the system controller will recirculate the waste water over the media bed a number of times prior to allowing the final disposal. Upon the system dosing the drip field enough to lower the level in the recirculation/dosing tank below the second level indicator, the final disposal of waste water will stop and the system will resume the operations described above for the condition where only the first level indicator is engaged.

In the event of excess waste water or a mechanical failure, waste water will continue to rise until the third level indicator is activated. The third level indicator will notify the user of a problem.

The system provides for treatment and disposal on a time dose basis as opposed to conventional demand dosing. The recirculation/dosing tank has sufficient volume to equalize and dilute the waste water strength during peak periods. Also, the system controller insures time interval dosing and exact measurements of effluent volume in order to stay within the design loading parameters for both the media bed and the final disposal field.

Other objects, advantages and capabilities of the invention will become apparent from the following description taken in conjunction with the accompanying drawings showing preferred embodiments of the invention.

BRIEF DESCRIPTION OF THE DRAWINGS

FIG. 5 is a cross-sectional elevational view of an above ground recirculating media bed equipped with dripper lines.

DESCRIPTION OF THE PREFERRED EMBODIMENTS

Figure 4:
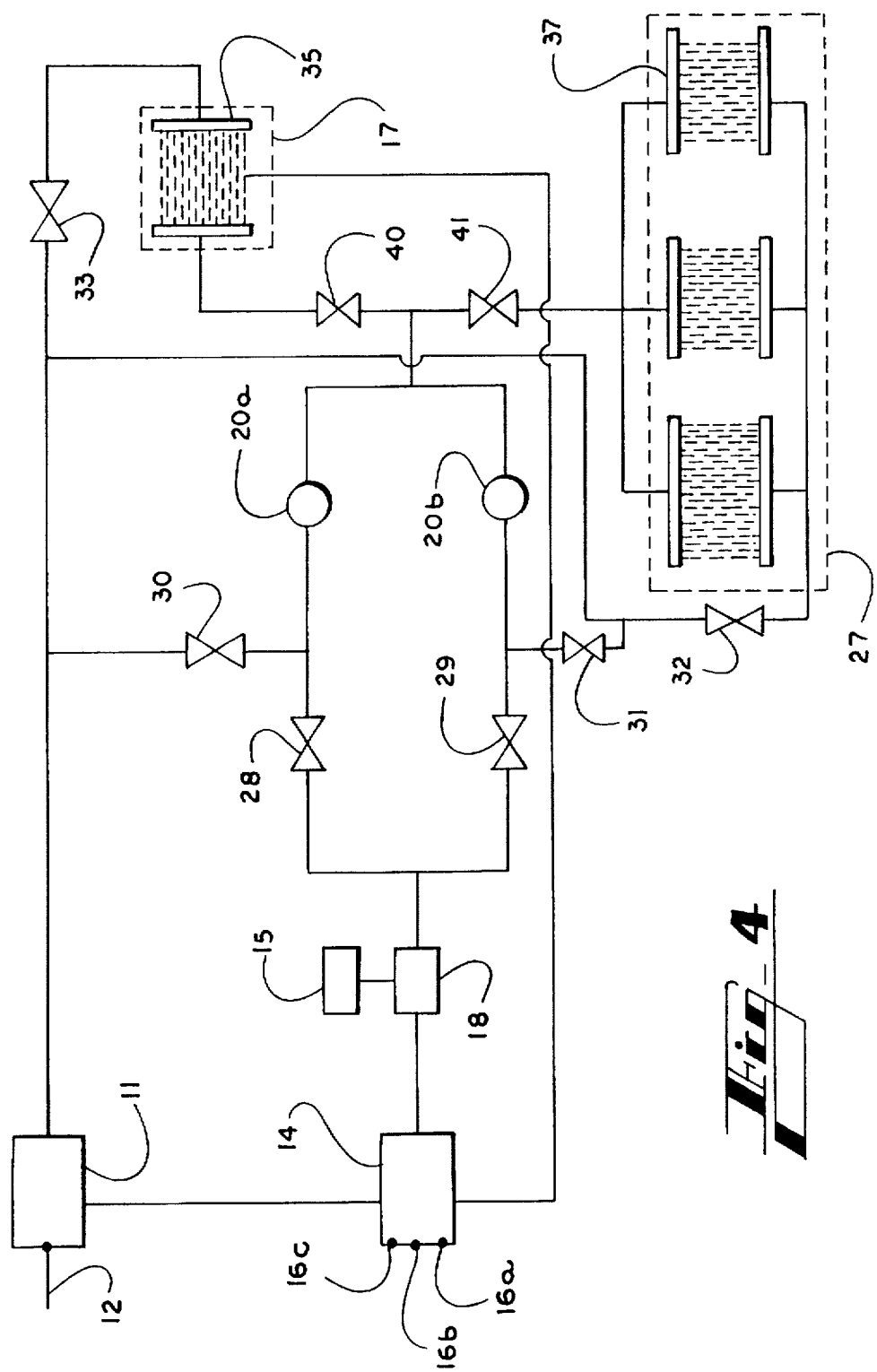
FIG. 4 is a schematic diagram of the elements of the present invention.

Referring to the drawings wherein like reference numerals designate corresponding parts throughout the several figures, and referring especially to FIG. 4 showing a schematic of the entire system for a typical residential application, the process will commence with waste water flowing into the treatment tank 11 at inlet 12. The treatment tank may be of any suitable type, such as a standard septic tank which acts as an anaerobic holding tank, or it may be an aeration system providing aerobic treatment to the waste water stream, or any other type of treatment system. The primary function of the treatment tank is the removal of the gravity settleable solids portion of the waste water.

From the treatment tank 11 the effluent containing untreated liquid and biodegradable solids traverses preferably by gravity through suitable piping 13 to the recirculation/dosing tank 14 which receives the effluent on the demand of the system. The recirculation/dosing tank 14 in conjunction with the system controller 15, controls and provides waste water effluent to the entire system. The system controller 15 and the pump 18 may be enclosed in a suitable housing 39. The level of effluent in the recirculation/dosing tank 14 is sensed by the system controller 15 through three level indicators 16a, 16b, and 16c. The first level indicator 16a provides enough waste water in the recirculation/dosing tank 14 to keep a media bed 17 active. Also, the first level indicator 16a maintains enough filtered waste water in the recirculation/dosing tank 14 to dilute the influent from the treatment tank 11 to maintain minimum quality for final disposal. For residential applications, the minimum liquid dilution volume in the recirculation/dosing tank 14 is preferably equal to the throughput of waste water for the system for one day in order to provide a resident water quality of a range of 30–60 mg/l of BOD and TSS. Overnight and other low use periods will polish this dilution portion thus enhancing the dilution effects and the quality of the effluent finally disposed to preferably less than 10 mg/l of BOD and TSS.

After the influent combines with the resident waste water, the combined effluent in the recirculation/dosing tank 14 is recirculated through the media bed for a preset and variable number of cycles. The media bed is dosed on a timed basis, such as every one and one-half (1½) hours or sixteen (16) times per day. If the system controller 15 senses the first level indicator 16a, the cycle begins with the system controller 15 activating the pump 18 which draws the combined effluent from the recirculation/dosing tank through the disc filters 20a and 20b. The disc filters can be sized at one inch diameter according to the flow rates, and the screens are preferably sized at one hundred fifteen (115) micron.

Prior to each dosing event, the disc filters may be backwashed with the backwashed material returning to the treatment tank 11 through the influent raw sewer line 12. In a typical disc filter backflush cycle, the system controller 15 activates the pump and then closes the first filter check valve 28, closes the downstream valves 40 and 41 to the media bed and final disposal field, and opens the first filter backflush valve 30. The resulting flow of waste water traverses through the second disc filter 20b and then backflushes the first disc filter 20a through backflush valve 30 before returning the waste water to the inlet 12 of the treatment tank 11 through the flush line 34.

In the second stage of the backflush cycle, the system controller activates the pump 18, closes the second filter check valve 29, closes the downstream valves to the media bed and final disposal field, and opens the second filter backflush valve 31. The resulting flow of waste water traverses through the first disc filter 20a and then backflushes the second disc filter 20b through backflush valve 31 before returning the waste water to the inlet of the treatment tank.

Figure 1:
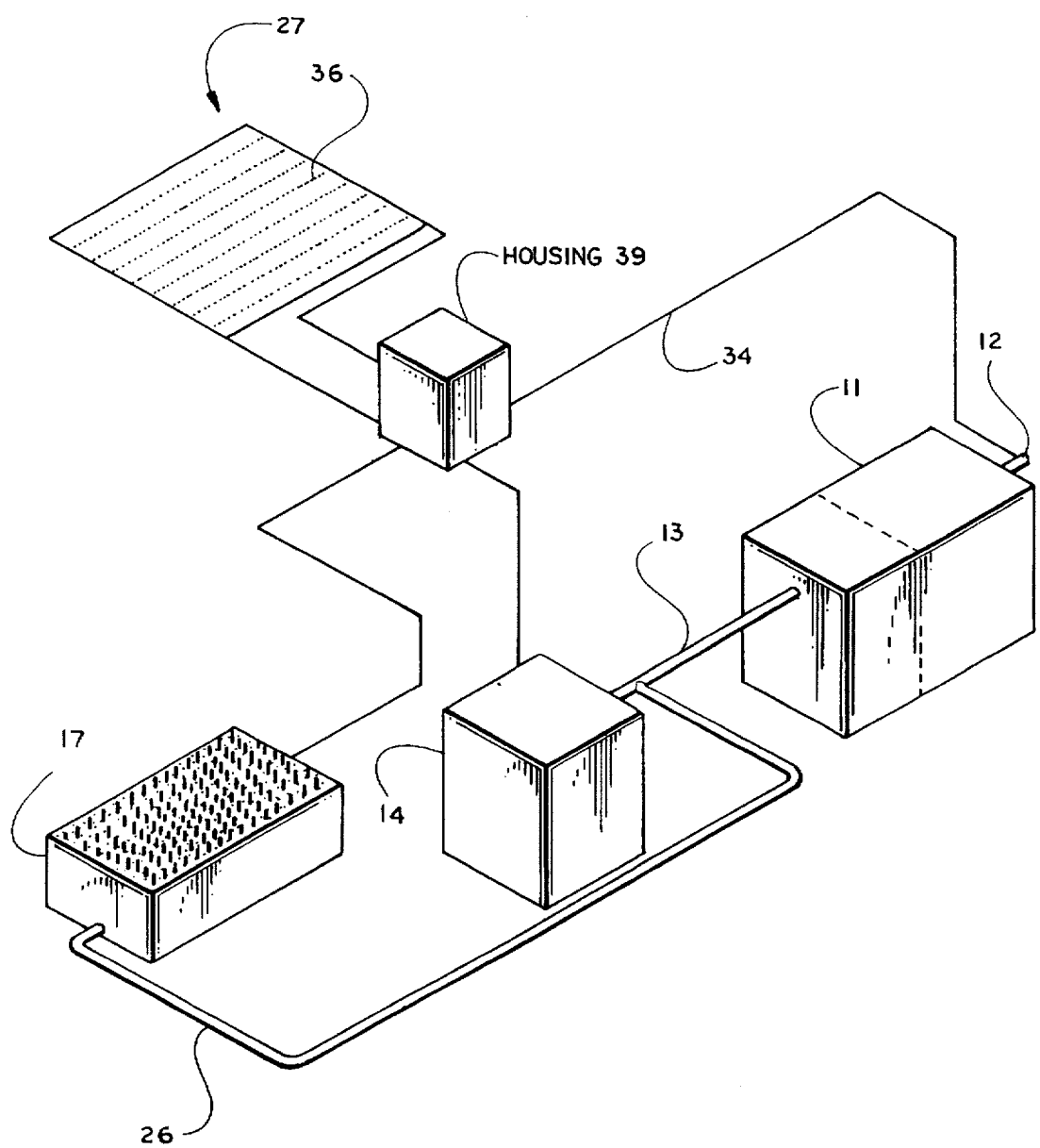
FIG. 1 is a perspective view of the elements of the present invention.
Figure 2:
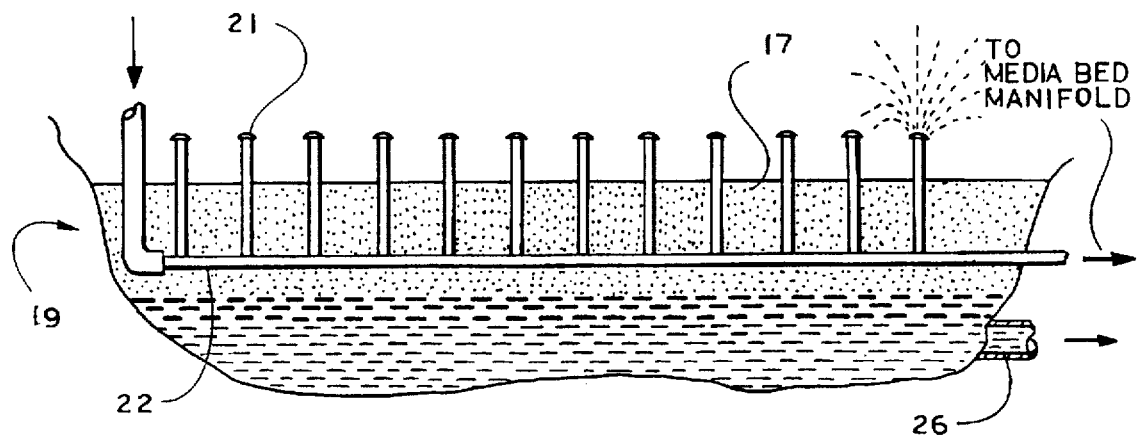
FIG. 2 is a cross-sectional elevational view of a recirculating media bed equipped with microsprayers.
Figure 3:
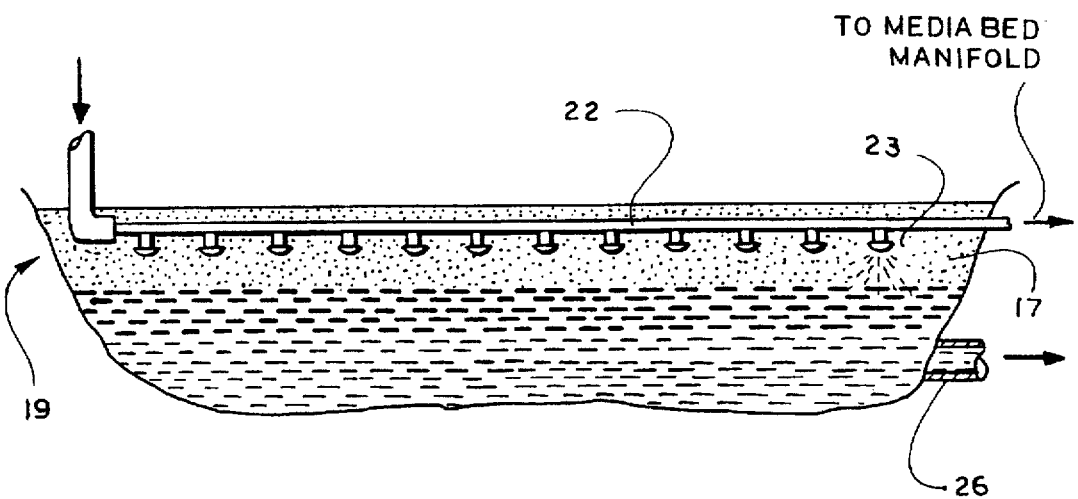
FIG. 3 is a cross-sectional elevational view of a recirculating media bed equipped with dripper lines.

After the backflush cycle is completed, the combined effluent passes through the disc filters 20a and 20b and flows to the media bed 17. A flow meter 38 may be added to the system after the disc filters. The media bed 17 has a surface exposed to ambient air and comprises particles of media which are preferably comprised of sand that is conducive to the growth and maintenance of aerobic organisms. These organisms facilitate biological treatment of the waste water. The effluent flows to the surface of the media bed 17 at a high rate perferably five (5) to ten (10) gallons per square foot per day, through a subsurface drip grid 19 consisting of parallel rows of polyethylene tubing, preferably one half (½) inch diameter, which comprise dripper lines 22. The dripper lines 22 provide even distribution by way of pressure compensating emitters 23 preferably spaced every twenty four (24) inches. The emitters 23 provide for high rate, (6 gal/hr) equal dosing across a wide range (5–70 PSI) of internal pressure. The emitters 23 will pass particles <800 microns and have a self purging cleaning action. The dripper lines 22 and the emitters 23 may be buried as in the subsurface drip field 19 as shown in FIG. 3 or positioned on top of the surface of the media bed 17 as shown in FIG. 5 or may be replaced with a series of standard irrigation microsprayers 21 as shown in FIG. 2. The dripper lines 22 join together at a media bed manifold 35 at the end of the tubing run. The manifold is connected to the return flush line 34 in order to allow for flushing of the dripper lines 22 at predetermined intervals. The buried emitters are buried at a sufficient depth for odor control but at a depth shallow enough to allow enough oxygen for the process. The resulting emitter blanket provided by the drip grid produces uniform filter coverage and insures longer filter bed performance by virtually eliminating the scouring of the filter bed surface. If the throughput rate of the effluent will allow, the combined effluent may be alternately distributed between a first area of the surface of the media bed 17 and a second area of the surface of the media bed 17 to allow the aerobic organisms additional time to break down the biodegradable solids portion of the waste water.

As a result of the equal distribution and prefiltering of effluent, the quality of the aerobically filtered effluent at the outlet of the media bed 17 can be expected to be less than 10 mg/l for BOD (biological oxygen demand material) and TSS (total suspended solids). Prefiltration of the effluent prior to application to the media bed 17 reduces the amount of suspended solids placed onto the filter surface which increases the efficiency of the filter. In order to keep the emitters free from blockage, the system controller 15 provides for high velocity forward flushing of the dripper line system at predetermined intervals with the resulting flush water being discharged to the septic tank influent line at the inlet 12. The media bed, field flush cycle begins with the pump 18 operating normally and thereby, causing the combined effluent to flow through the disc filters 20a and 20b and into the dripper lines 22 of the subsurface drip field 19. At the predetermined time for the dripper lines to be flushed, the system controller causes the media bed, flush valve 33 to open causing a rapid and substantial movement of effluent through the dripper lines 22 and into the media bed manifold 35. From the media bed manifold 35, the effluent enters the return flush line 34 where it is returned to the treatment tank 11.

After the effluent passes through the media bed 17 under the normal operation of the system, the effluent is returned to the recirculation/dosing tank 14 through return line 26. At the recirculation/dosing tank the aerobically filtered effluent from the media bed 17 combines again with the treatment tank 11 influent. After a predetermined number of cycles with the second level indicator 16b not activated, the media bed 17 will be rested.

According to the usage of the system, the waste water will flow from the treatment tank 11 into the recirculation/dosing tank 14 and activate the second level indicator 16b. The second level indicator 16b will allow disposal of the waste water into the final disposal field 27. The final disposal field is preferably divided into a plurality of disposal zones which can be dosed alternately or simultaneously depending on the requirements of the system. In the disposal cycle, the system controller 15 will activate the pump which will cause the combined effluent to flow through the disc filters 20a and 20b to the final disposal field 27, and as discussed previously, the disc filters may be backwashed prior to each dosing event. At the final disposal field, the effluent is applied to the soil through the subsurface drip field 25 consisting of parallel rows of polyethylene tubing, known as dripper lines at a slow, controlled rate. The final disposal dripper lines 36 provide even distribution by way of pressure compensating emitters 23. The depth of installation is dependent upon factors such as soil type and land usage. The system should be installed and set for flow rates and spacing of emitters in the subsurface drip field 25 wherein, under normal conditions, the possibility of ground water and surface contamination is eliminated.

It has been found that in a typical residential environment, a waste water treatment system with a five hundred (500) gallon per day treatment capacity will be sufficient. For this system, the maximum flow rate is typically estimated at one hundred eighty (180) gallons per hour. Flow equalization is required and is accomplished by at least a one-half (½) day storage capacity in the recirculation/dosing tank. The volume of effluent between the second level switch 16b and the third level indicator 16c is the flow equalization volume. It should have the capacity to handle a peak flow event without having an alarm, and the capacity to equalize the dosing of the drain field over the desired time. Dosing of the drain field is on a time and volume basis. Time dosing allows the soil pores to drain and allows air into the biomass to treat the waste water. Dosing the soil absorption area with the low rate emitters allows the waste water to be distributed at the rate the soil can absorb it.

The emitters will pass particles <800 microns and have a self purging cleaning action. In order to keep the emitters free from blockage, the system controller 15 provides for high velocity forward flushing of the drip tube system at predetermined intervals with the resulting flush water being discharged to the raw sewer line. The final disposal field flush cycle begins with the pump 18 operating normally and thereby, causing the combined effluent to flow through the disc filters 20a and 20b and into the dripper lines 36 of the subsurface drip field 25. At the predetermined time for the dripper lines to be flushed, the system controller causes the drip field flush valve 32 to open causing a rapid and substantial movement of effluent through the dripper lines 36 and into the drip field manifold 37. From the drip field manifold 37, the effluent enters the return flush line 34 where it is returned to the treatment tank 11.

If the second level indicator 16b has been disengaged for a sufficient period of time prior to the system controller 15 calling for the final disposal cycle, the system controller 15 will recirculate the waste water over the media bed 17 a number of times prior to allowing the final disposal into the subsurface drip field 25. Upon the system dosing the subsurface drip field 25 enough to lower the level in the recirculation/dosing tank 14 below the second level indicator 16b, the final disposal of waste water will stop and the system will resume the operations described above for the condition where only the first level indicator 16a is engaged.

If peak flows are found to be excessive, the system controller will increase the recirculation rate automatically when the second level indicator 16b is activated. If the peak event subsides and the second level switch 16b is deactivated for a set period of time, the recirculation rate will be reduced by the system controller to rest the filters.

In the event of excess waste water or a mechanical failure, waste water will continue to rise until the third level indicator 16c is activated. The third level indicator 16c will notify the user of a problem.

Various modifications may be made of the invention without departing from the scope thereof and it is desired, therefore, that only such limitations shall be placed thereon as are imposed by the prior art and which are set forth in the appended claims.

What is claimed is:

1. A method for on-site treatment of waste water, the waste water comprising solids and untreated liquid, the solids comprising gravity settleable solids and biodegradable solids, the method comprising:

effecting solid-liquid separation of the gravity settleable solids to produce an anaerobic effluent, conveying the anaerobic effluent to a recirculation/dosing tank, combining the anaerobic effluent with collected, aerobically treated and filtered effluent that is resident in the recirculation/dosing tank to produce a combined effluent, prefiltering the combined effluent to further reduce the solids in the combined effluent to produce a prefiltered effluent, distributing the prefiltered effluent to a surface of a media bed, which contains a media conducive to the growth and maintenance of aerobic organisms for biological treatment of the wastewater to produce an aerobically treated and filtered effluent, if a first level indicator in the recirculation/dosing tank is engaged or distributing the prefiltered effluent to a final disposal field, if a second level indicator in the recirculation/dosing tank is engaged, collecting the aerobically treated and filtered effluent from the media bed to produce a collected, aerobically treated and filtered effluent, and returning the collected, aerobically treated and filtered effluent to the recirculation/dosing tank.

2. A method for on-site treatment of wastewater as recited in claim 1, wherein the step of distributing the prefiltered effluent includes selectively distributing effluent to the media bed upon the condition that effluent has not passed through the media bed for a predetermined amount of time.

3. A method for on-site treatment of wastewater as recited in claim 1, wherein the step of prefiltering the combined effluent includes prefiltering the combined effluent through a disc filter to screen the solids.

4. A method for on-site treatment of wastewater as recited in claim 1, wherein the step of distributing the prefiltered effluent includes distributing the prefiltered effluent into the media bed through a subsurface drip grid.

5. A method for on-site treatment of wastewater as recited in claim 1, wherein the step of distributing the prefiltered effluent includes distributing the prefiltered effluent into the media bed through an above ground drip grid.

6. A method for on-site treatment of wastewater as recited in claim 1, wherein the step of distributing the prefiltered effluent includes distributing the prefiltered effluent into the media bed through a series of microsprayers.

7. A method for on-site treatment of wastewater as recited in claim 1, wherein the step of distributing the prefiltered effluent includes distributing the prefiltered effluent into the media bed at a rate of five (5) to ten (10) gallons per square foot per day.

8. A method for on-site treatment of wastewater as recited in claim 1, wherein the step of distributing the prefiltered effluent includes distributing the prefiltered effluent to the final disposal field through a subsurface drip field.

9. A method for on-site treatment of wastewater as recited in claim 1, wherein the step of conveying the anaerobic effluent includes conveying the anaerobic effluent to a recirculation/dosing tank having a volume equal to the volume of the wastewater throughput for one-half to one day of operation of the treatment method.

10. A method for on-site treatment of wastewater as recited in claim 1, wherein the step of distributing the prefiltered effluent includes distributing the prefiltered effluent intermittently between a first area of the surface of the media bed and a second area of the surface of the media bed to allow additional time for the aerobic organisms to break down the biodegradable solids.

11. A method for on-site treatment of waste water, the waste water comprising solids and untreated liquid, the solids comprising gravity settleable solids and biodegradable solids, the method comprising:

effecting solid-liquid separation of the gravity settleable solids to produce an anaerobic effluent, conveying the anaerobic effluent to a recirculation/dosing tank, combining the anaerobic effluent with collected, aerobically treated and filtered effluent that is resident in the recirculation/dosing tank to produce a combined effluent, prefiltering the combined effluent to further reduce the solids in the combined effluent to produce a prefiltered effluent, distributing the prefiltered effluent to a surface of a media bed through a drip grid, the media bed containing a media conducive to the growth and maintenance of aerobic organisms for biological treatment of the waste water to produce an aerobically treated and filtered effluent, if a first level indicator in the recirculation/dosing tank is engaged or distributing the prefiltered effluent to a final disposal field having a drip field, if a second level indicator in the recirculation/dosing tank is engaged, flushing the drip grid periodically with the aerobically treated and filtered effluent to clean the solids from the drip grid, flushing the drip field periodically with the aerobically treated and filtered effluent to clear the solids from the drip field, collecting the aerobically treated and filtered effluent from the media bed to produce a collected, aerobically treated and filtered effluent, and returning the collected, aerobically treated and filtered effluent to the recirculation/dosing tank.

12. An on-site waste water treatment system for treatment of wastewater, the wastewater comprising solids and untreated liquid, the solids comprising gravity settleable solids and biodegradable solids, the system comprising:

(a) separating means for separating the gravity settleable solids from the wastewater, the separating means having an outlet;

(b) a recirculation/dosing tank, the recirculation/dosing tank having an inlet, the inlet being connected to the outlet of the separating means, the recirculation/tank having a resident effluent to dilute the wastewater from the separating means;

(c) filtering means for filtering solids from the wastewater, the filtering means having an outlet;

(d) a media bed containing particles of a media conducive to the growth and maintenance of aerobic organisms for biological treatment of the wastewater, the media bed having a surface exposed to ambient air, the media bed receiving wastewater from the outlet of the filtering means, the media bed having an outlet;

(e) a return line, the return line having a first end and a second end, the first end connected to the outlet of the media bed and the second end connected to the inlet of the recirculation/dosing tank;

(f) disposal means for disposing of the wastewater at predetermined, intermittent times;

(g) distribution means for distributing the wastewater, the distribution means connected to the filter means, the media bed and the disposal means; and (h) conveying means for conveying the wastewater to the distribution means and returning the wastewater from the outlet of the media bed to the recirculation/dosing tank through the return line.

13. The system of claim 12, wherein the recirculation/dosing tank further comprises:

a first level indicator positioned at a level in the recirculation/dosing tank which indicates the presence of a sufficient volume of waste water for dosing the media bed, and a second level indicator positioned at a level in the recirculation/dosing tank which indicates a sufficient volume of waste water for final disposal.

14. The system of claim 12, wherein the distribution means further comprises a subsurface drip grid, the subsurface drip grid having a plurality of tubing with pressure compensating emitters positioned along the length of the tubing, the tubing positioned beneath the surface of the media bed, and the emitters positioned to provide equal distribution of the combined effluent across the surface of the media bed.

15. The system of claim 12, wherein the distribution means further comprises an above surface drip grid, the above surface drip grid having a plurality of tubing with pressure compensating emitters positioned along the length of the tubing, the tubing positioned directly above the surface of the media bed and the emitters positioned to provide equal distribution of the waste water across the surface of the media bed.

16. The system of claim 12, wherein the distribution means further comprises a plurality of microsprayers, the microsprayers positioned above the surface of the media bed and positioned to provide equal distribution of the waste water across the surface of the media bed.

17. The system of claim 13, wherein the treatment system further comprises controlling means for controlling whether the waste water is recirculated to the recirculation/dosing tank or conveyed to the disposal means, depending on the level of the combined effluent present in the recirculation/dosing tank, the controlling means recirculating the waste water to the recirculation/dosing tank when the first level indicator is engaged, and the controlling means conveying the waste water to the disposal means when the second level indicator is engaged.

18. The system of claim 12, wherein the disposal means further comprises a subsurface drip field, the subsurface drip field having a plurality of tubing with pressure compensating emitters positioned along the length of the tubing, the tubing positioned beneath the surface of the soil and the emitters positioned to provide equal distribution of the combined effluent across the area of the disposal site.

19. The system of claim 12, wherein the recirculation/dosing tank further comprises the recirculation/dosing tank being sized to accommodate a minimum liquid dilution volume equal to a volume of the waste water throughput for one-half to one day of operation of the system.

20. The system of claim 12, wherein the distribution means further comprises the distribution means distributing the waste water intermittently between a first area of the surface of the media bed and a second area of the surface of the media bed to allow additional time for the aerobic organisms to break down the biodegradable solids.

21. An on-site waste water treatment system for treatment of waste water, the waste water comprising solids and untreated liquid, the solids comprising gravity settleable solids and biodegradable solids, the system comprising:

(a) separating means for separating the gravity settleable solids from the waste water, the separating means having an outlet;

(b) a recirculation/dosing tank, the recirculation/dosing tank having an inlet, the inlet being connected to the outlet of the separating means, the recirculation/tank having a resident effluent to dilute the waste water front the separating means;

(c) filtering means for filtering solids from the waste water, the filtering means leaving an outlet;

(d) a media bed containing particles of a media conducive to the growth and maintenance of aerobic organisms for biological treatment of the waste water, the media bed having a surface exposed to ambient air, the media bed receiving waste water from the outlet of the filtering means, the media bed having an outlet;

(e) a return line, the return line having a first end and a second end, the first end connected to the outlet of the media bed and the second end connected to the inlet of the recirculation/dosing tank;

(f) disposal means for disposing of the waste water at predetermined, intermittent times, the, disposal means having a drip field and first flushing means to flush the drip field;

(g) distribution means for distributing the waste water, the distribution means connected to the filter means, the media bed and the disposal means, the distribution means having a drip grid and second flush means to flush the drip grid;

(h) conveying means for conveying the waste water to the distribution means and returning the waste water from the outlet of the media bed to the recirculation/dosing tank through the return line; and (i) a flush line, the flush line operably connected to the first and second flushing means and to the separating means.

* * * * *